Patented Oct. 19, 1943

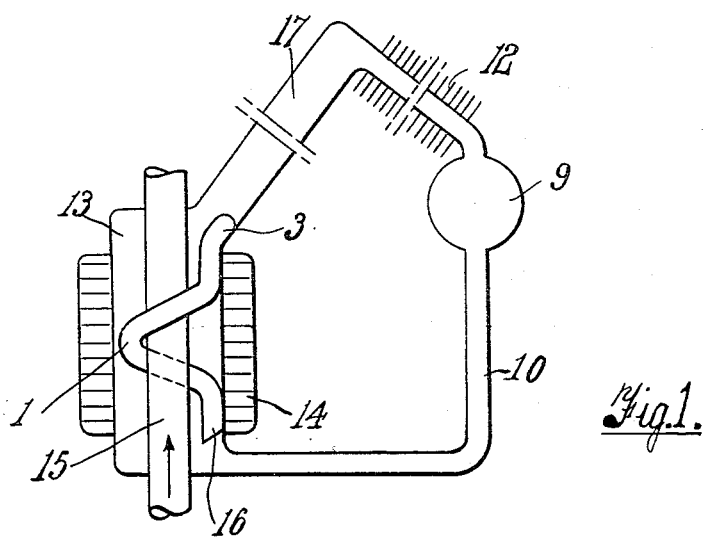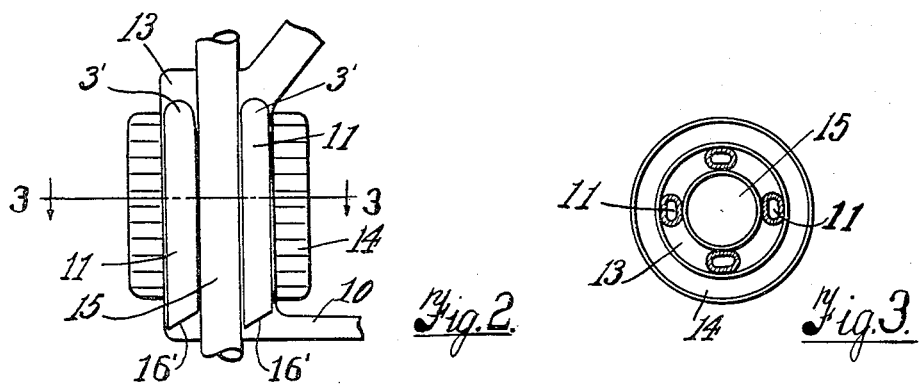

2,331,898

UNITED STATES PATENT OFFICE 2,331,898

CIRCULATING SYSTEM, PARTICULARLY FOR REFRIGERATING APPARATUS

Nils Erland af Kleen, Stockholm, Sweden

Application February 9, 1940, Serial No. 318,148 In Great Britain August 3, 1939

3 Claims. (Cl. 62—125)

This invention relates to circulating systems for refrigerating apparatus and more particularly to systems in which the circulating fluid is vaporized in one part of the system and condensed in another part thereof, the last mentioned part of the system being located at a higher level than the first mentioned part so that a natural circulation is obtained.

The object of the invention is to promote rapid circulation of the heat transferring medium in such systems and to ensure that a vigorous circulation shall be maintained even when there is no great temperature difference between different parts of the system.

To this end, the invention consists in providing auxiliary vaporizing means for the heat transferring medium of the heat transfer system, said auxiliary vaporizing means extending upwardly and being in open communication at the lower end with the vaporizing portion of the heat transfer system and being closed at the upper end so that vapor formed therein is trapped above the liquid level. As vaporization continues in said auxiliary vaporizing means, the accumulated vapor breaks the liquid seal to pass into the vaporizing portion of the heat transfer system. In this manner, pulses are created in the heat transfer system by vapor passing from the auxiliary vaporizing means to the vaporizing portion of the system to assist the movement of the vapor formed in the latter and speed up the normal circulation of the heat transferring medium through the heat transfer system.

The nature of the invention and the method of its performance will be more readily understood from the following description illustrated by the accompanying drawing, in which Fig. 1 is a diagrammatic view of a vaporization-condensation heat transfer system employed to remove absorption heat from absorption type refrigerating apparatus and showing one form of auxiliary vaporizing means in accordance with the invention;

Fig. 2 is a detailed view of the vaporizing portion of a heat transfer medium showing another form of auxiliary vaporizing means in accordance with the present invention, and Fig. 3 is a sectional view taken on line 3—3 of Fig. 2.

Referring to the drawing and more particularly to Fig. 1, there is shown a secondary cooling system formed by a plurality of interconnected parts including vaporizing chamber 13, condenser 12, collecting vessel 9 and return conduit 10 for the circulation of a vaporizable medium in heat exchange relation with the boiler-absorber of intermittent absorption type refrigerating apparatus to remove absorption heat during the absorbing periods. The vaporizing chamber 13 is arranged intermediate the absorbent chamber 14 of the boiler-absorber and a heating flue 15 and, in the form shown, the auxiliary vaporizing means comprises a tubular member 1 disposed in the chamber 13 and extending upwardly from the lower portion of the latter in a winding course toward the upper portion of the chamber. The tubular member 1 is closed at its upper end as at 3 and is open at its lower end as at 16 in communication with the chamber 13 to permit the entry thereinto of the heat transferring medium flowing to the chamber from the vessel 9.

During the absorption periods, the heat transferring medium flows as liquid from the vessel 9 through pipe 10 into the chamber 13 and into the lower open end of the tubular member 1. The liquid vaporizes in the chamber 13 and the vapor passes to the condenser 12 where it is liquefied, flows to the vessel 9 and returns by way of pipe 10 into the chamber 13. Liquid also vaporizes in the tubular member 1 but as the upper end of the latter is closed, the vapor is trapped and as vaporization continues, the pressure builds up therein by the accumulation of vapor above the liquid level while the amount of liquid sealing the bottom of the auxiliary vaporizing means diminishes correspondingly until finally the liquid seal is broken and the trapped vapor passes into the chamber 13 and up to the condenser 12. Upon the release of the trapped vapor from the auxiliary vaporizing means, liquid again enters the bottom thereof and vaporization again takes place therein to repeat the operation just described. In this manner, pulses are created in the heat transfer system by the formation of vapor in the auxiliary vaporizing means and the passage of such vapor intermittently into the heat transfer system to assist the removal of vapor formed in the chamber 13 for circulation through the system, thereby increasing the normal circulation of the heat transferring medium through the system.

The tubular member 1 is composed of heat conducting material and where, as shown in Fig. 1, the vaporizing chamber 13 is disposed between the absorbent chamber 14 of the boiler-absorber and the central heating flue 15, a portion of the tubular member is arranged in good thermal contact with the absorbent chamber 14 and another portion is arranged in good thermal contact with the heating flue 15 for the conduction of heat from the heating source to the absorbent chamber during the heating periods.

While I have shown and described the auxiliary vaporizing means in Fig. 1 as comprising a single tubular member 1, obviously, several tubular members may be employed to achieve a more rapid circulation of the heat transferring medium. Moreover, instead of being formed as a coil having a portion of length in good thermal contact with the absorbent chamber and another portion of length in good thermal contact with the heating flue, straight tubes may be employed such as shown in Figs. 2 and 3 and indicated by the reference numeral 11. As therein illustrated, the tubes 11 bridge the annular space formed by the chamber 13 between the heating flue 15 and the absorbent chamber 14 to provide a heat conductive connection between the absorbent chamber and the heating flue during the heating periods of the boiler-absorber. As in the case of the auxiliary vaporizing means hereinabove described in connection with Fig. 1, each of the tubes 11 is open at its lower end as at 15' in communication with the chamber 13 and is closed at its upper end as at 3' to trap the vapor formed therein, which vapor periodically breaks the liquid seal at the bottom of the associated tube to assist in the removal of vapor formed in the chamber 13 and speed up the normal circulation of the heat transferring medium through the heat transfer system.

From the foregoing it is believed that the construction, operation and advantages of the invention will be readily understood by those skilled in the art without further description, it being borne in mind that numerous changes may be made in the details disclosed without departing from the spirit of the invention as set out in the following claims.

I claim:

1. In absorption refrigerating apparatus having a boiler-absorber adapted to be alternately heated and cooled, heating means for said boiler-absorber, and a closed circulating system for a vaporizable liquid medium including an annular chamber in thermal exchange relation with said boiler-absorber and intermediate the latter and said heating means for the vaporization of the medium to cool the boiler-absorber; means for increasing the normal circulation of the medium through said system comprising upwardly extending tubular heat conducting means in said vaporizing chamber in open communication at the lower end with the medium in said chamber and closed at the upper end, said tubular means being in thermal exchange relation with the heating means and with the boiler-absorber for the conduction of heat from the heating means to the boiler-absorber during the heating periods, said tubular means forming auxiliary vaporizing means for the medium circulating through said closed system during the cooling periods, the lower open end of said tubular means being sealed by the liquid medium in said vaporizing chamber, and the medium vaporizing in said tubular means periodically breaking said seal to circulate through the system.

2. In absorption refrigerating apparatus having a boiler-absorber adapted to be alternately heated and cooled, heating means for said boiler-absorber, and a closed system for the circulating of a vaporizable liquid medium including an annular chamber in thermal exchange relation with said boiler-absorber and intermediate the latter and said heating means, for the vaporization of the medium to cool the boiler-absorber; means for increasing the normal circulation of the medium through said system, comprising coiled tubular heat-conducting means extending upwardly from the bottom of said chamber and having a portion in thermal exchange relation with said heating means and another portion in thermal exchange relation with said boiler-absorber for the conduction of heat from the heating means to the boiler-absorber during the heating periods, said tubular means being open communication at the lower end with the medium in said chamber and closed at the upper end and forming auxiliary vaporizing means for the medium circulating through said system during the cooling periods, the lower open end of said tubular means being sealed by the liquid medium in said chamber, and the medium vaporizing in said tubular means periodically breaking the seal to circulate through said system.

3. In absorption refrigerating apparatus having a boiler-absorber adapted to be alternately heated and cooled, heating means for said boiler-absorber, and a closed system for the circulation of the vaporizable liquid medium and including an annular chamber in thermal exchange relation with said boiler-absorber and intermediate the latter and said heating means, for the vaporization of the medium to cool said boiler-absorber; means for increasing the normal circulation of the medium through said system comprising a series of substantially vertical tubular heat-conducting members in said annular chamber, open at their lower ends and closed at their upper ends, one side of said members being in thermal exchange relation with said heating means and the other side thereof being in thermal exchange relation with said boiler-absorber whereby said members serve to conduct the heat from said heating means to said boiler-absorber during the heating periods, said members forming auxiliary vaporizing chambers for the medium circulating through said closed system during the cooling periods, the lower ends of said members being sealed by the liquid medium in said chamber, and the medium vaporizing in said members periodically breaking the seal to circulate through said system.

NILS ERLAND AF KLEEN.